(12) United States Patent
Acharya et al.

(10) Patent No.: US 8,289,859 B2
(45) Date of Patent: Oct. 16, 2012

(54) LINK DELAY DETERMINATION USING VIRTUAL CONCATENATION

(75) Inventors: Swarup Acharya, New Providence, NJ (US); Bhawna Gupta, Edison, NJ (US); Pankaj Risbood, Roselle, NJ (US); Anurag Srivastava, Roselle, NJ (US)

(73) Assignee: Alcatel Lucent, Paris (FR)

( * ) Notice: Subject to any disclaimer, the term of this patent is extended or adjusted under 35 U.S.C. 154(b) by 1834 days.

(21) Appl. No.: 10/853,422

(22) Filed: May 25, 2004

(65) Prior Publication Data

US 2005/0265251 A1 Dec. 1, 2005

(51) Int. Cl.
*G08C 15/00* (2006.01)
*H04J 3/06* (2006.01)

(52) U.S. Cl. ............ 370/252; 370/517; 370/907
(58) Field of Classification Search ............ 370/252
See application file for complete search history.

(56) References Cited

U.S. PATENT DOCUMENTS

| | | | |
|---|---|---|---|
| 5,408,465 A * | 4/1995 | Gusella et al. | 370/231 |
| 6,917,630 B1 * | 7/2005 | Russell et al. | 370/532 |
| 2002/0090009 A1 * | 7/2002 | Yehuda et al. | 370/517 |
| 2003/0074449 A1 * | 4/2003 | Smith et al. | 709/226 |
| 2003/0202540 A1 * | 10/2003 | kfir et al. | 370/498 |
| 2004/0037182 A1 * | 2/2004 | Hayashi | 369/47.16 |
| 2004/0114539 A1 * | 6/2004 | Beshai et al. | 370/254 |
| 2004/0213268 A1 * | 10/2004 | Gupta et al. | 370/395.51 |
| 2005/0254522 A1 * | 11/2005 | Benvenuti et al. | 370/474 |

FOREIGN PATENT DOCUMENTS
WO  WO 03063396 A1 * 7/2003

OTHER PUBLICATIONS

Garg and Paul, Managing Differential Delay in SONET Architectures, Jan. 30, 2002, CommsDesign (available online: http://www.commsdesign.com/showArticle.jhtml;jsessionid=32NMKV3KCU4MQQSNDLPSKHSCJUNN2JVN?articleID=16504021).*

J. Edmonds et al., "Theoretical Improvements in Algorithmic Efficiency for Network Flow Problems," Journal of ACM, vol. 19, No. 2, pp. 248-264, Apr. 1972.

James B. Orlin, "A Faster Strongly Polynomial Minimum Cost Flow Algorithm," Proceedings of the 20th ACM Symposium on the Theory of Computing, pp. 377-387, 1988.

(Continued)

*Primary Examiner* — Andrew Chriss
(74) *Attorney, Agent, or Firm* — Ryan, Mason & Lewis, LLP (57) ABSTRACT

Link delay is determined in a network comprising a plurality of nodes by identifying pairs of nodes associated with a given link, and, for each of the identified pairs, setting up a virtually-concatenated group (VCG) between the nodes of that pair. The VCGs are utilized to make delay measurements, and the delay measurements are processed to determine delay of the given link. In an illustrative embodiment, the VCGs comprise two-member VCGs with the members being routed on opposite sides of a logical ring. For a given one of these two-member VCGs, a differential delay measurement is made at a particular one of the associated nodes by comparing frame indicator fields for concurrently arriving frames. A system of equations is generated based on the differential delay measurements made utilizing the VCGs, and the system of equations is solved to obtain information utilizable to determine delay of the given link.

18 Claims, 5 Drawing Sheets

OTHER PUBLICATIONS

G. Garg et al., "Managing Differential Delay in SONET Architectures," EE Times, pp. 1-5, Jan. 2002.
D. Karger et al., "On Approximating the Longest Path in a Graph," Algorithmica 18, pp. 1-17, 1997.
U.S. Appl. No. 10/446,220, filed May 28, 2003, S. Acharya et al., "Fast Restoration for Virtually-Concatenated Data Traffic."
U.S. Appl. No. 10/745,881, filed Dec. 26, 2003, S. Acharya et al., "Route Determination Method and Apparatus for Virtually-Concatenated Data Traffic."
U.S. Appl. No. 10/856,444, filed May 28, 2004, H.S. Nagesh et al., "Route Determination with Differential Delay Compensation for Virtually-Concatenated Data Traffic."

* cited by examiner

LINK DELAY DETERMINATION USING VIRTUAL CONCATENATION

RELATED APPLICATIONS

The present invention is related to the inventions described in U.S. patent application Ser. No. 10/446,220, filed May 28, 2003 and entitled "Fast Restoration for Virtually-Concatenated Data Traffic," and U.S. patent application Ser. No. 10/745,881 filed Dec. 26, 2003 and entitled "Route Determination Method and Apparatus for Virtually-Concatenated Data Traffic," the disclosures of which are incorporated by reference herein.

FIELD OF THE INVENTION

The present invention relates generally to data communication networks which utilize virtual concatenation. More particularly, the invention relates to techniques for determining link delay in such networks.

BACKGROUND OF THE INVENTION

Circuit-switched network architectures, such as those based on synchronous optical network (SONET) or synchronous digital hierarchy (SDH) standards, were originally designed to support voice traffic using dedicated fixed-bandwidth connections. Although such networks are advantageous in that they incorporate substantial reliability and protection mechanisms, their primary disadvantage has been a lack of bandwidth efficiency.

Packet-switched network architectures, which include those based on asynchronous transfer mode (ATM) or Internet protocol (IP) standards, have traditionally been much better able than circuit-switched architectures to handle data traffic. Since data traffic is inherently bursty, it leads to underutilization of the fixed-bandwidth connections of conventional circuit-switched networks. Packet-switched network architectures provide the benefits of statistical multiplexing, which allows for better handling of bursty data traffic.

Recently, virtual concatenation (VC) and link capacity adjustment scheme (LCAS) protocols have been developed which allow more efficient use of the existing fixed-bandwidth connections associated with circuit-switched SONET/SDH network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node, also referred to herein as a sink node. The destination node recombines the streams to reconstruct the original VCG.

The LCAS protocol enhances the basic virtual concatenation functionality described above by allowing so-called "hitless" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

The above-cited U.S. patent application Ser. No. 10/446, 220 and Ser. No. 10/745,881 provide additional performance improvements beyond those associated with the conventional VC and LCAS protocols.

It is often desirable, when implementing VC or LCAS related techniques, to provide compensation for differential delays of the diverse routes over which the various members of a VCG are transmitted. Providing such a capability in conventional practice typically requires that each network node be configured to include a differential delay buffer. Since a given destination node may receive different diversely-routed members at different times, the differential delay buffer is used to store member data until all members are received and the original data stream can be properly reconstructed.

Additional details regarding conventional aspects of differential delay compensation can be found in, for example, G. Garg et al., "Managing Differential Delay in SONET Architectures," EE Times, January 2002, which is incorporated by reference herein.

In provisioning a set of diverse routes for members of a VCG, it is important to have an accurate estimation of link delays. For example, link delay determination is essential for proper implementation of Quality of Service (QoS) in delay-sensitive applications such as voice transmission. A given provisioned VCG circuit with a non-zero differential delay will require the destination node to hold the faster arriving members in memory until the slower ones arrive. Holding these members consumes differential delay buffer space at the sink node. Since many network nodes have only a small amount of buffer memory, the onus is on the routing algorithm to ensure that the VCG circuit is not set up along routes where members will experience more differential delay than can be accommodated by the corresponding nodes. Thus, not all sets of diverse routes between a given pair of nodes are feasible, since one or more of the sets of diverse routes could result in a differential delay that cannot currently be compensated by the available buffer space.

It is therefore apparent that accurate and efficient link delay determination can facilitate the provisioning of diverse routes for VCG members. Unfortunately, conventional link delay determination techniques fail to provide a sufficient level of efficiency and accuracy, particularly in the VCG provisioning context. The link delay in a SONET/SDH network is typically comprised of two components, namely, propagation delay, which is dependent upon the span length and speed of light in the transmission medium, and equipment delay, which is introduced by various types of network equipment in the span, such as amplifiers, regenerators, etc. In conventional practice, the span length and its associated transmission properties are usually not known with precision. This forces service providers either to approximate such parameters or to utilize a proportional cost assignment approach when performing QoS routing.

Accordingly, a need exists for improved techniques for determining link delays in networks carrying virtually-concatenated data traffic.

SUMMARY OF THE INVENTION

The present invention meets the above-noted need by providing link delay determination techniques which utilize virtual concatenation to determine link delay.

In accordance with one aspect of the invention, link delay is determined in a network comprising a plurality of nodes by identifying pairs of nodes associated with a given link, and, for each of the identified pairs, setting up a VCG between the nodes of that pair. The VCGs are utilized to make delay measurements, and the delay measurements are processed to determine delay of the given link.

In an illustrative embodiment, the VCGs comprise two-member VCGs with the members being routed on opposite sides of a logical ring topology of the network. For a given one of these two-member VCGs, a differential delay measurement is made at a particular one of the associated network nodes by comparing frame indicator fields for concurrently arriving frames. A system of equations is generated based on the differential delay measurements made utilizing the VCGs, and the system of equations is solved to obtain information utilizable to determine delay of the given link.

In accordance with another aspect of the invention, delay is determined for a given one of the VCGs by configuring a first node associated with the VCG to send a frame indicator or other designated information that is substantially the same as that received from a second node associated with the VCG. The delay in this case may be determined as a function of a round-trip delay measurement made using the designated information.

Advantageously, the link delay determination techniques of the invention provide enhanced efficiency and accuracy, and are particularly useful in the VCG provisioning context. These techniques are suitable for centralized or distributed implementation, and can be adapted for use with a wide variety of network topologies.

DETAILED DESCRIPTION OF THE INVENTION

The invention will be illustrated herein in conjunction with illustrative embodiments of link delay determination algorithms, as well as a network-based system and example network nodes in which the link delay determination techniques may be implemented. It should be understood, however, that the invention is not limited to use with the particular link delay determination techniques, network-based system or network node implementations described, but is instead more generally applicable to any network application in which it is desirable to provide improved determination of link delay.

The present invention in the illustrative embodiments to be described determines link delay in the context of Ethernet over SONET (EoS) and other types of data traffic which utilize virtual concatenation.

Figure 1:
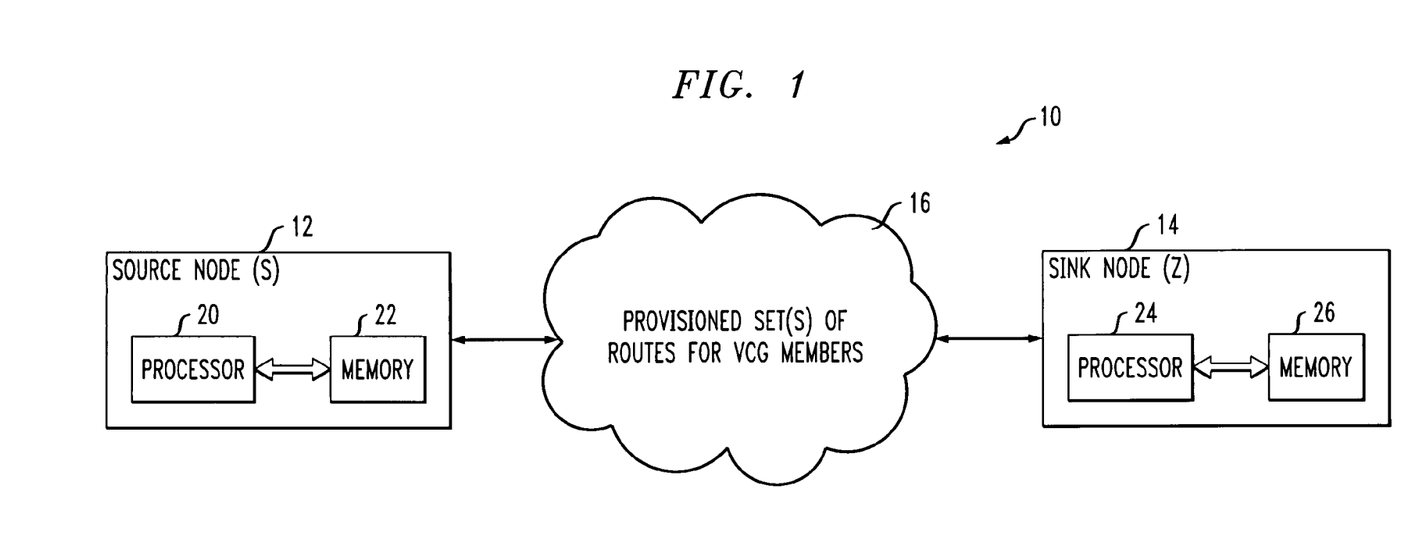
FIG. 1 illustrates a portion of a data transmission network in which the invention is implemented.

Referring now to FIG. 1, a data transmission network 10 includes a source node 12, a sink node 14, and one or more provisioned sets of routes 16 for VCG members. It is to be appreciated that the figure shows only a portion of a typical network, for simplicity and clarity of description. The network nodes 12, 14, although illustratively shown as a source-sink node pair, may comprise an ingress-egress node pair, or any other pair of network nodes.

The source and sink nodes are also denoted herein as S and Z nodes, respectively. The source node 12 includes a processor 20 coupled to a memory 22. Similarly, the sink node 14 includes a processor 24 coupled to a memory 26. The memory elements of the nodes 12, 14 store one or more software programs for execution by the corresponding processors in implementing virtual concatenation operations such as forming VCGs and determining appropriate routes for VCG members, using the above-noted G.707 and G.7042 standards documents, or other communication protocols. The conventional aspects of the operation of nodes 12, 14 in transmitting virtually-concatenated data traffic through network 10 are well known in the art and therefore will not be described in detail herein.

As disclosed in the above-cited U.S. patent application Ser. No. 10/446,220, the VCG for which a given set of routes is provisioned may comprise a plurality of primary members and at least one backup member. This is in contrast to conventional VCGs, in which each member is a primary member and there are no backup members, and considerably facilitates restoration of member traffic in the event of link failures. Further improvements in restoration may be achieved through utilization of a modified LCAS protocol as described in the above-cited U.S. patent application Ser. No. 10/446, 220. It should be noted that these and other restoration techniques are not a requirement of the present invention, but may be desirable to implement in a given embodiment. The present invention can alternatively be implemented using conventional restoration techniques, or no restoration technique.

In accordance with the invention, the processors 20, 24 and associated memories 22, 26 are also used in storage and execution of one or more software programs for implementing a link delay determination algorithm of the type to be described in greater detail below.

Figure 2:
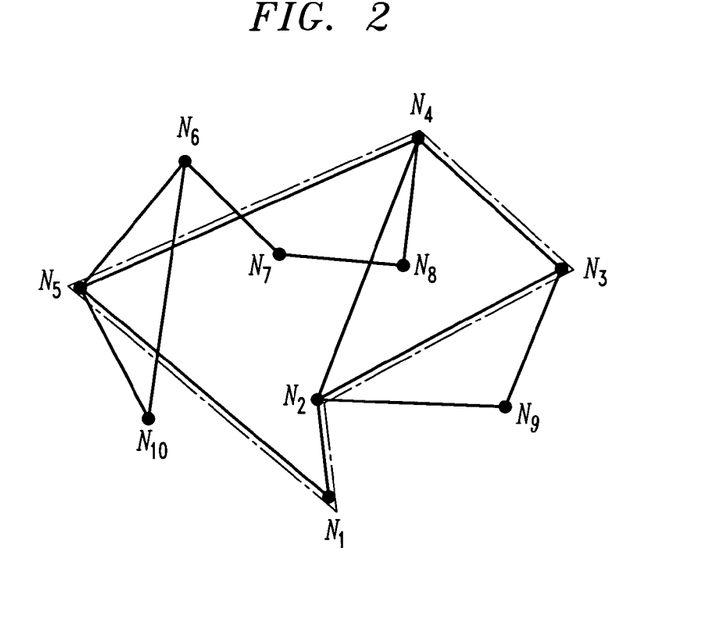
FIGS. 2 and 3 show more detailed views of exemplary sets of nodes and links in the FIG. 1 network.
Figure 3:
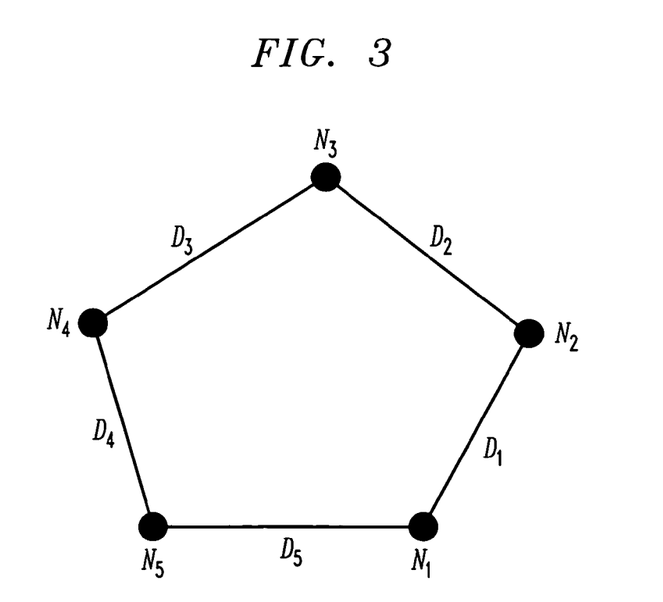

A number of exemplary algorithms for determining link delay in a data transmission network will now be described with reference to the network diagrams of FIGS. 2 and 3. The exemplary link delay determination algorithms are denoted herein as Algorithm A, Algorithm B and Algorithm C. It should be emphasized that the particular network arrangements of FIGS. 2 and 3 are presented by way of example, and other embodiments may utilize different link delay determination algorithms and different network configurations.

As specified in the above-cited ITU-T document G.707, SONET uses the Path Overhead (POH) H4 byte to carry a VC header for Higher Order (HO) concatenation. Each SONET frame, sent every 125 microseconds (μs), carries one H4 byte. The entire VC header takes 16 consecutive SONET frames (i.e., one multiframe) and is thus sent once every 125 μs*16=2 milliseconds (ms). The VC header is carried on each of the VCG members.

Since VCG members are typically diversely routed, they may incur different delays and arrive at different times at the sink node. The sink node uses the Multiframe Indicator (MFI) field of the multiframe header to perform phase alignment of VCG members. This 12-bit field is a running frame number, which allows for compensation of differential delay of up to 256 ms among VCG members. The MFI is composed of two parts: MFI-1 (4 bits), which is incremented every frame, and MFI-2 (8 bits), which is incremented every multiframe. The virtual concatenation process also assigns a unique Sequence Number (SQ) to each VCG member. The assigned SQs are used by the sink node in recombining the member streams.

The differential delay between any two VCG members can be computed at the sink node by determining the difference between their MFIs for concurrently arriving frames. Since the MFI bits are sent every 125 µs, the accuracy of any such differential delay determination is bounded by that limit. When the VCG circuit is bidirectional, the source node is also able to determine the differential delay between any two VCG members in this manner.

The differential delay between any two members of a VCG may be specified as the difference between the sum of the absolute delays of the links on the two routes followed by the VCG members. Thus, for a two-member VCG C, with members $M_1$ and $M_2$ using respective paths $P_1$ and $P_2$, the differential delay $\delta_C$ can be expressed as $$\sum_{links L_i \in P_1} D_i - \sum_{links L_j \in P_2} D_j = \delta_C.$$

By obtaining a sufficient number of such equations, a consistent system of equations is generated. A unique solution to the system of equations can provide sufficient information to permit computation of the absolute delay values of the individual links.

In order to utilize Algorithm A or Algorithm B below, any such individual links generally must be part of a biconnected component. A biconnected component of a graph is a subgraph where any single link removal does not partition the component or, in other words, there exists a bypass route for each link of the component. This biconnectivity criterion is met by most practical SONET/SDH networks, which are typically designed using ring topologies. It should also be noted that Algorithm C does not require biconnected components.

FIG. 2 shows a portion of network that will be used to illustrate the operation of the delay determination algorithms described herein. The network portion shown includes nodes $N_1$ through $N_{10}$, interconnected by various links, and may be viewed as a portion of network 16 of FIG. 1. A particular biconnected component of the FIG. 2 network is indicated by the dashed line in the figure, and is in the form of a logical ring. The term "logical ring" as used herein refers generally to a set of nodes that are interconnected logically in the form of a ring, although their physical setup need not take that particular shape. It is to be appreciated, however, that the invention does not require that the network have a logical ring structure or any other particular arrangement of interconnected nodes.

FIG. 3 shows the logical ring in isolation, and as is apparent, the logical ring includes nodes $N_1$ through $N_5$, interconnected by links having delays denoted $D_1$ through $D_5$.

The exemplary link delay determination algorithms to be described below are denoted herein as Algorithm A, Algorithm B and Algorithm C. These algorithms determine link delays by measuring the differential delay for selected VCGs. For purposes of simplicity and clarity of description, and without the loss of generality, it will be assumed that the network nodes have zero delay. Those skilled in the art will recognize that non-zero node delays can be easily taken into account using standard node transformation techniques, such as those described in R.K. Ahuja et al., "Network Flows: Theory, Algorithms, and Applications," Prentice Hall, 1993, which is incorporated by reference herein.

Algorithm A

Consider initially a logical ring having a structure similar to that of the example logical ring shown in FIG. 3. Assume that the network ring has n nodes ($N_1, N_2, \ldots N_n$) and n links ($L_{1,2}, L_{2,3}, \ldots L_{n,1}$) with delays ($D_{1,2}, D_{2,3}, \ldots D_{n,1}$). The operation of Algorithm A as applied to such a network is as follows.

1. Each node $N_i$ sets up a two-member VCG ($M_1, M_2$) to its neighbor $N_{i+1}$ in the ring such that the routes taken by the two members are along opposite sides of the ring.

2. Since the circuit is bidirectional, each node $N_i$ measures the differential delay $\delta_{i,i+1}$.

3. For a given VCG set up between nodes $N_m$ and $N_{m+1}$, one can write an equation for the corresponding delay as $$\sum_{i \in (\{1 \ldots n\} \& i \neq m)} D_{i,(i+1) \bmod n} - D_{m,m+1} = \delta_m.$$

4. Step 3 is repeated for each of the other VCGs to obtain a system of n equations. Such a system of equations is consistent and can be solved to compute the individual link delays.

5. Once the system of equations is solved, a particular individual link delay $D_{k,k+1}$ for a link $L_{k,k+1}$ may be determined by computing $$D_{k,k+1} = \frac{1}{2}\left(\frac{\sum_{i \in \{1 \ldots n\}} \delta_{i,(i+1) \bmod n}}{n-2} - \delta_{k,k+1}\right).$$

As a more particular example of the operation of Algorithm A, consider its application to the logical ring shown in FIG. 3. Using the process described above, the following system of five equations is obtained for the logical ring:

$$D_{2,3}+D_{3,4}+D_{4,5}+D_{5,1}-D_{1,2}=\delta_1$$

$$D_{1,2}+D_{3,4}+D_{4,5}+D_{5,1}-D_{2,3}=\delta_2$$

$$D_{1,2}+D_{2,3}+D_{4,5}+D_{5,1}-D_{3,4}=\delta_3$$

$$D_{1,2}+D_{2,3}+D_{3,4}+D_{5,1}-D_{4,5}=\delta_4$$

$$D_{1,2}+D_{2,3}+D_{3,4}+D_{4,5}-D_{5,1}=\delta_5$$

This is a set of five equations with five unknowns, and can be solved through straightforward application of well-known conventional techniques. After the above set of equations is solved, the individual delays for the five links of the logical ring can be determined as follows:

$$D_{1,2} = \frac{1}{2}\left(\frac{\delta_1 + \delta_2 + \delta_3 + \delta_4 + \delta_5}{3} - \delta_1\right)$$

$$D_{2,3} = \frac{1}{2}\left(\frac{\delta_1 + \delta_2 + \delta_3 + \delta_4 + \delta_5}{3} - \delta_2\right)$$

$$D_{3,4} = \frac{1}{2}\left(\frac{\delta_1 + \delta_2 + \delta_3 + \delta_4 + \delta_5}{3} - \delta_3\right)$$

$$D_{4,5} = \frac{1}{2}\left(\frac{\delta_1 + \delta_2 + \delta_3 + \delta_4 + \delta_5}{3} - \delta_4\right)$$

$$D_{5,1} = \frac{1}{2}\left(\frac{\delta_1 + \delta_2 + \delta_3 + \delta_4 + \delta_5}{3} - \delta_5\right)$$

It is generally preferable in a given implementation of Algorithm A that the differential delay information obtained from the various VCGs be brought to a centralized point for performing the link delay computation. The centralized point could be, for example, a network management system, a designated network node, or other type of central controller. It is to be appreciated, however, that Algorithm A does not require any particular type of centralized implementation.

Once the individual delays are computed for each of the links on one logical ring, another logical ring may be selected and the link delay determination process repeated for that logical ring. It should be noted that a VCG need not be set up for any link for which delay is already known, and any such values can instead be used directly in the system of equations. For any logical ring with k unknown link delays, one can formulate a consistent set of k equations and determine the individual link delays in the manner described previously. Thus, when using Algorithm A, the total number of two-member VCGs that need to be set up to determine the individual delays for all network links is equivalent to the total number of links.

Algorithm B

Algorithm B is specifically designed for distributed implementation, in that only the two end points of a given link are involved in computing the delay for that link. In accordance with the algorithm, the following steps are used to compute the delay $D_{i,j}$ of a single link $L_{i,j}$ between nodes $N_i$, $N_j$ in the network.

1. One of the nodes $N_i$ or $N_j$ is designated as an initiator node. The other node is designated as a follower node. This determination could be based on a unique key associated with each node, or on any other criteria. Assume the node $N_i$ is selected as the initiator node.

2. Initiator node $N_i$ sets up a two-member VCG to a selected other node $N_k$ such that the two routes of the VCG are disjoint and one of the routes goes over the link $L_{i,j}$.

3. Note that these two routes may be viewed as forming a ring $R_i$ involving nodes $N_i$, $N_j$ and $N_k$ and also link $L_{i,j}$.

4. Initiator node $N_i$ computes the differential delay $\delta_i$ for this VCG.

5. Initiator node $N_i$ now requests follower node $N_j$ to set up a two-member VCG to the selected other node $N_k$ such that the two routes are on opposite sides of ring $R_i$.

6. Follower node $N_j$ computes the differential delay $\delta_j$ for this VCG.

7. The difference between the delay values $\delta_i$ and $\delta_j$ is twice the absolute delay of the link $L_{i,j}$. The link delay $D_{i,j}$ may therefore be computed as $$D_{i,j} = \frac{\delta_i - \delta_j}{2}.$$

As a more particular example of the operation of Algorithm B, consider its application to the link between nodes $N_4$ and $N_5$ in the network of FIG. 2. Assume that node $N_4$ is designated as the initiator node and it selects node $N_2$ as the other node. Thus, the equation for the VCG set up by the initiator node $N_4$ is $$D_{4,5}+D_{5,1}+D_{1,2}-D_{2,3}-D_{3,4}=\delta_4$$

and the equation for the VCG set up by the follower node $N_5$ is $$D_{5,1}+D_{1,2}-D_{4,5}-D_{2,3}-D_{3,4}=\delta_5$$

The delay of the link between nodes $N_4$ and $N_5$ is then given by $$D_{4,5} = \frac{\delta_4 - \delta_5}{2}.$$

The simplicity of Algorithm B makes it particularly well suited to a distributed implementation. However, this is not a requirement of the invention, and it is possible for the algorithm to be implemented in a centralized manner, or using a hybrid combination of distributed and centralized implementation.

Algorithm C

Both Algorithm A and Algorithm B above require a biconnected network topology. Algorithm C relaxes this restriction and provides an approach applicable to general topologies. It also utilizes the MFI bits of the VC protocol, albeit for a different reason. More specifically, Algorithm C determines individual link delays using round trip delay measurements rather than differential delay measurements.

As mentioned in previous sections, MFI bits are visible to both source and sink nodes for bidirectional VCGs. However, the ITU-T standard does not require these numbers to be synchronized. In other words, MFI bits sent out by the source and sink nodes, at any given point in time, are not required to be same. Since the standard does not specify any particular relation between these two independently-running MFI counters, altering them will not violate the standard or cause any incompatibility.

Algorithm C makes use of this flexibility by forcing a sink node to send out the same MFI bits that are received from the source node. Thus, at any given point in time, before sending a new frame out to the source node, the sink node will first look at the MFI bits of the latest frame received from the source node. Since in SONET/SDH, frames are sent every 125 µs, this explicit synchronization is required only for the first frame. Synchronization for the subsequent frames is automatically achieved.

Using this approach, any MFI bits arriving at the sink node are sent out again within 125 µs. Therefore, the source node can compute the round trip delay for the VCG at any time by comparing the MFI bits of a frame going out to the sink node to the MFI bits of a frame coming in from the sink node. The difference of these MFI numbers will give the round trip delay, half of which would be the delay of the corresponding link.

Note that with this approach only the source node can measure the link delay. The sink node has no information about the delay. However, this delay information can be propagated to the sink node through a network management system or other type of central controller, as well as through distributed mechanisms, or combinations thereof. The sink node can also independently set up a circuit to the source node in order to compute the delay in an identical manner. Algorithm C also assumes that a node knows whether it is a source node or a sink node of a given VCG.

Advantageously, Algorithms A, B and C as described above, and variants thereof, provide enhanced efficiency and accuracy in link delay determination, and are particularly useful in the VCG provisioning context. These techniques are suitable for centralized or distributed implementation, and may be applied to a wide variety of common network topologies.

A given one of the link delay determination algorithms described above may be implemented in a network-based system comprising a plurality of network nodes. Exemplary network and network node implementations of the invention will now be described with reference to FIGS. 4, 5 and 6.

Figure 4:
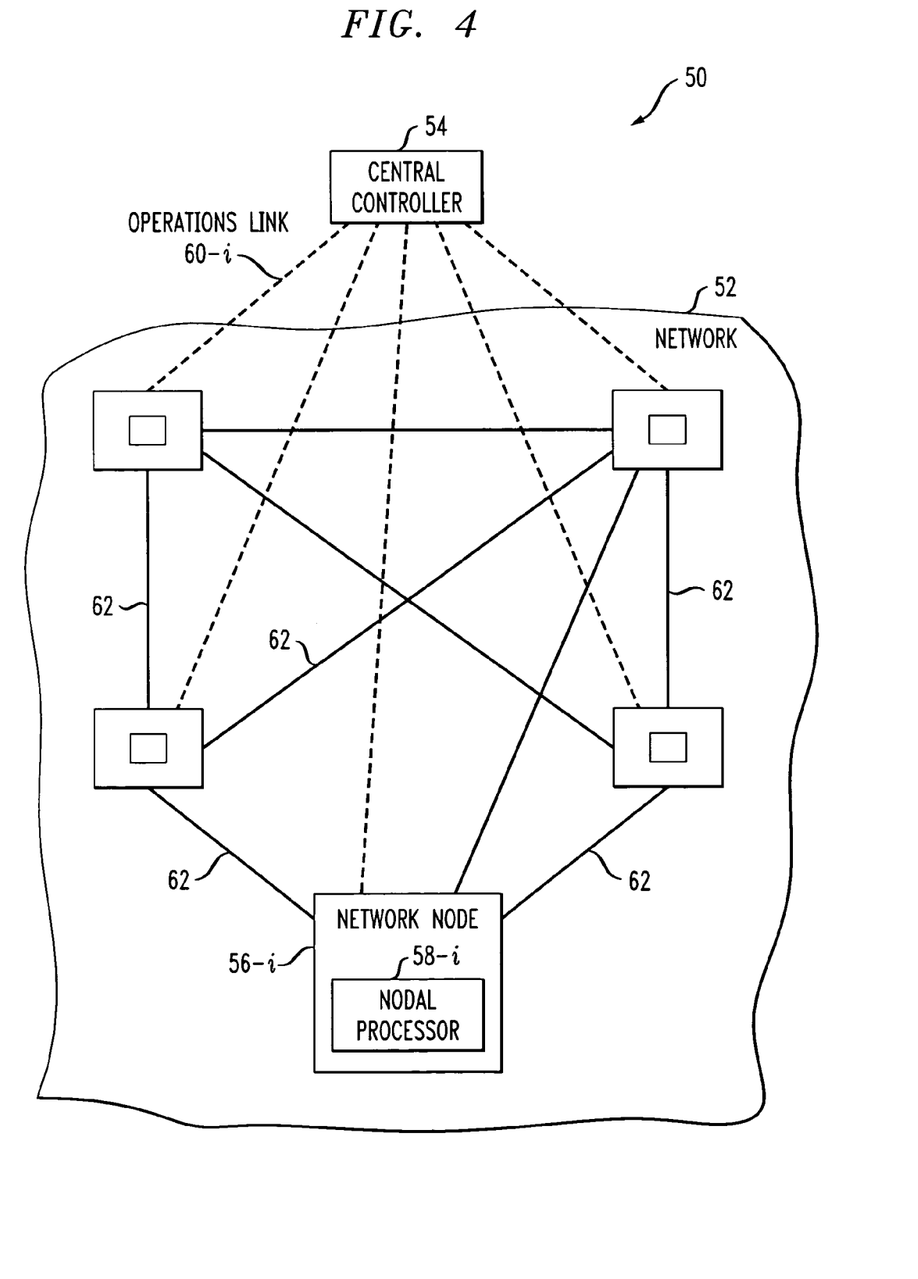
FIG. 4 shows an example network-based system in which a link delay determination algorithm in accordance with the invention is implemented.

FIG. 4 shows an exemplary network-based system 50 in which techniques of the present invention can be implemented. The system 50 includes a network 52 and a central controller 54. The network 52 may comprise, by way of example, an Internet protocol (IP)-optical wavelength division multiplexed (WDM) mesh network, although the invention may be utilized with any type of network. The network 52 includes a number of nodes 56-i, i=1, 2, ... N. Each of the nodes 56-i includes a corresponding nodal processor 58-i. The nodes 56-i of network 52 are interconnected by, for example, optical fiber connections 62. In this example, each of the nodes 56-i has a fiber connection to three other nodes. Each of the nodes 56-i is also connected to the central controller 54 via a corresponding operations link 60-i, shown as a dashed line in FIG. 4.

The central controller 54 and nodes 56-i may each represent a computer, server, router, gateway or other suitable digital data processor programmed to implement at least a portion of a link delay determination algorithm of the present invention.

It should be noted that the system of FIG. 4 is considerably simplified for purposes of illustration. The invention is well suited for use in large-scale regional, national and international networks which may include many subnetworks, each having hundreds of nodes.

The central controller 54 may or may not participate in link delay determination, depending upon the particular implementation. For example, a fully distributed implementation need not utilize the central controller 54.

Figure 5:
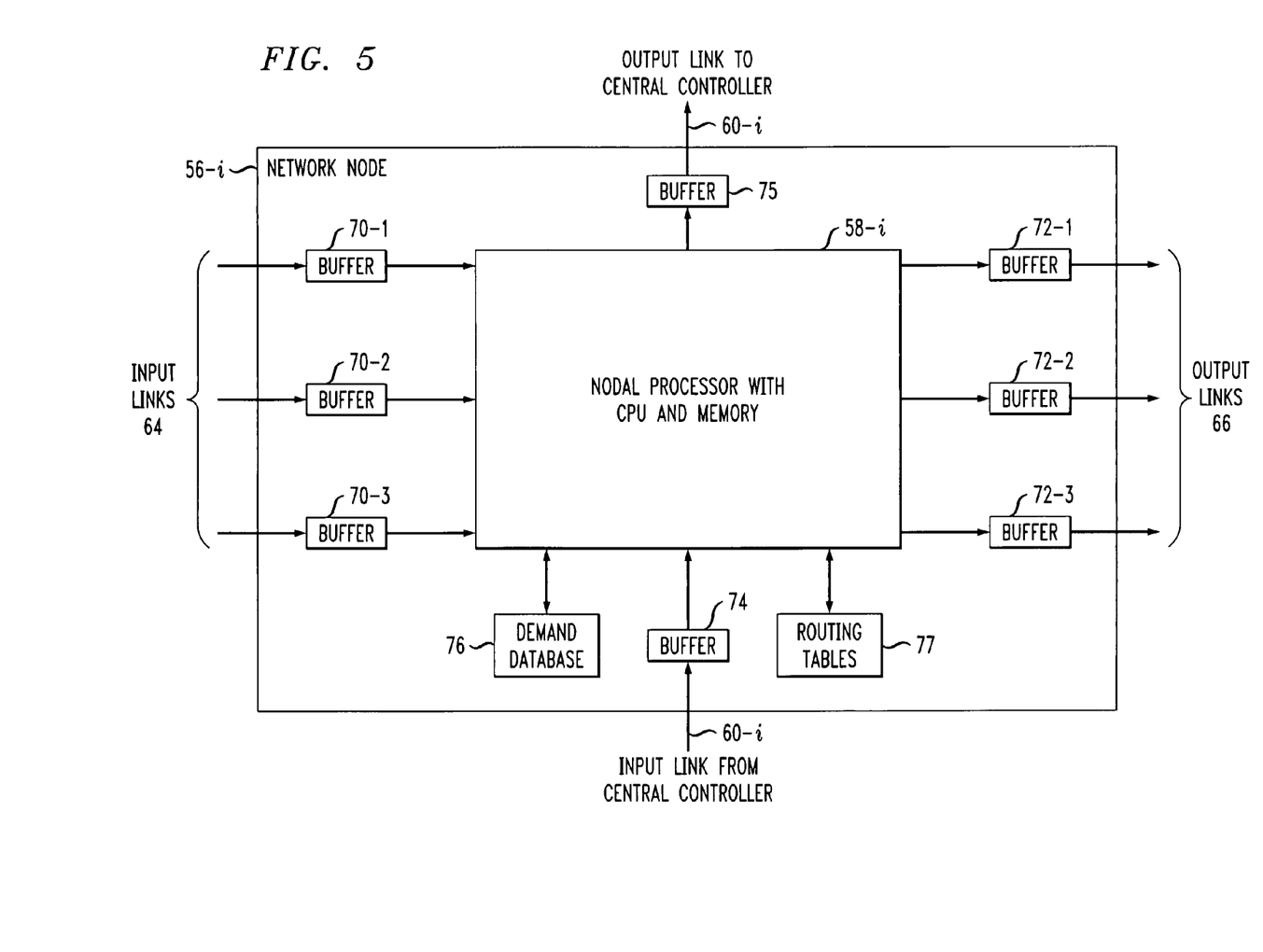
FIGS. 5 and 6 show different possible implementations of a given network node in the FIG. 4 system.

FIG. 5 shows one of the nodes 56-i of network 52 in greater detail. The node 56-i includes a nodal processor 58-i which includes a central processing unit (CPU) and memory. A set of input links 64, corresponding to fiber connections 62 with three other nodes, are connected to buffers 70-1, 70-2 and 70-3 in node 56-i. The node 56-i supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical conversion for signals received on input links 64, while the buffers 72-1, 72-2 and 72-3 may provide electrical-to-optical conversion for signals to be transmitted on output links 66.

The operational link 60-i of node 56-i to the central controller 54 includes an input operational link which is coupled to nodal processor 58-i via an input buffer 74, and an output operational link which receives signals from nodal processor 58-i via an output buffer 75. The node 56-i also includes a demand database 76 for storing demands for network capacity, and a set of routing tables 77 which specify routes through the network for particular demands. The demand database 76 and routing tables 77 may be components of a common memory within node 56-i, and may be combined with or otherwise associated with the memory of nodal processor 58-i. The node 56-i has been simplified for purposes of illustration, and as noted above may include a substantially larger number of input and output links, as required for a given application.

Figure 6:
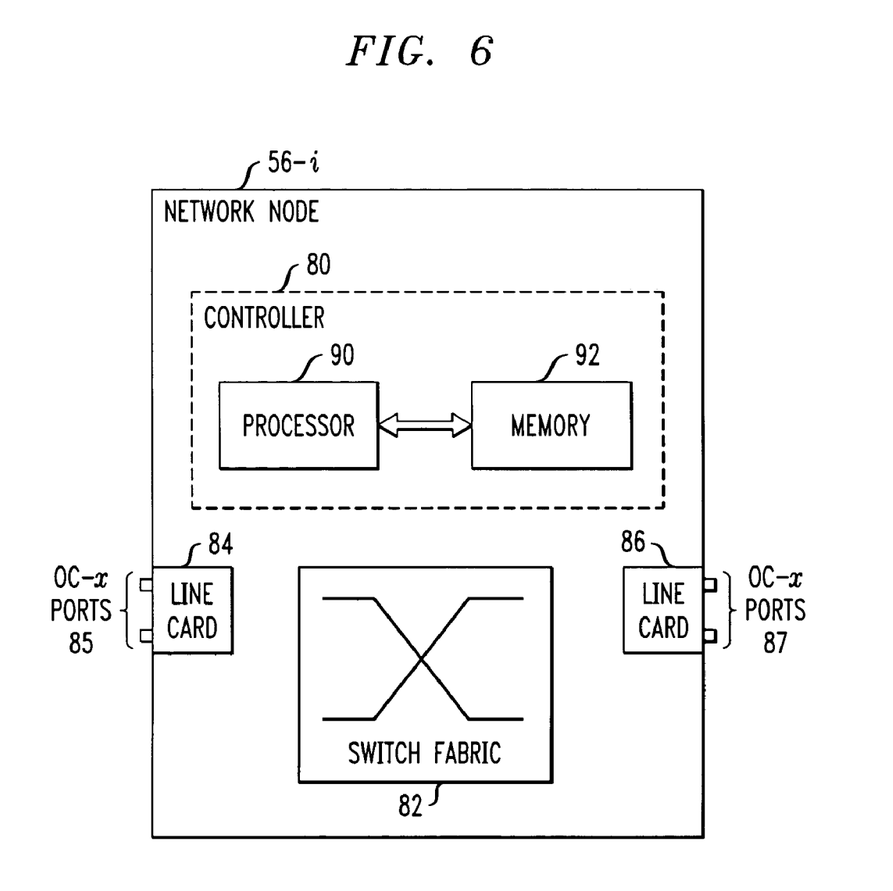

FIG. 6 shows another exemplary implementation of a given one of the network nodes 56-i of the FIG. 4 network-based system.

The network node 56-i in this example includes a controller 80, a switch fabric 82, a first line card 84 having a set of OC-x ports 85 associated therewith, and a second line card 86 having a set of OC-x ports 87 associated therewith. It should be understood that the node 56-i has again been simplified for purposes of illustration. For example, the node 56-i as shown in FIG. 6 may in practice include a substantially larger number of line cards and ports, as required for a given application.

The controller 80 includes a processor 90 and a memory 92. The processor 90 may be, e.g., a microprocessor, a microcontroller, an application-specific integrated circuit (ASIC) or other type of processing device, as well as portions or combinations of such devices. The memory 92 may include an electronic random access memory (RAM), a read-only memory (ROM) or other type of storage device, as well as portions or combinations of such devices. The memory 92 may be used to store a demand database for storing demands for network capacity, and a set of routing tables which specify routes through a corresponding network for particular demands.

As indicated previously, the node 56-i may be an element of an optical network or other type of network which includes a very large number of nodes, and possibly a central controller. One or more of the nodes and the central controller may each represent a computer, processor-based switch or other type of processor-based device configured to provide link delay determination in accordance with the invention.

The implementations described in conjunction with FIGS. 4, 5 and 6 are presented by way of example, and it is to be appreciated that the invention can be implemented in numerous other applications.

The above-described embodiments of the invention are intended to be illustrative only. For example, the techniques of the invention may be applied to any routing application, without regard to the type, arrangement or configuration of the network, network nodes, or communication protocols.

For example, in alternative embodiments the particular steps utilized in a given link delay determination algorithm may be varied from those steps shown in the foregoing example link delay determination algorithms.

These and numerous other alternative embodiments within the scope of the following claims will be readily apparent to those skilled in the art.

We claim:

1. A processor-implemented method of determining link delay in a network comprising a plurality of nodes, the method comprising the steps of:
   identifying pairs of nodes associated with a given link;
   for each of the identified pairs, setting up a virtually-concatenated group between the nodes of that pair;
   utilizing the virtually-concatenated groups to make delay measurements; and
   processing the delay measurements to determine delay of the given link;
   wherein one or more of the virtually-concatenated groups comprise two-member virtually-concatenated groups; and
   wherein for a given two-member virtually-concatenated group C, the group having members $M_1$ and $M_2$ using respective paths $P_1$ and $P_2$, a differential delay measurement $\delta_C$ is determined as $$\sum_{links L_i \in P_1} D_i - \sum_{links L_j \in P_2} D_j = \delta_C,$$

$D_i$ and $D_j$ being delays of respective links $L_i$ and $L_j$.

2. The method of claim 1 wherein a given one of the delay measurements made utilizing a particular virtually-concatenated group comprises a differential delay measurement.

3. The method of claim 1 wherein the virtually-concatenated group that is set up for a particular identified pair comprises at least two diversely-routed members.

4. The method of claim 1 wherein the processing step further includes the steps of:
generating a system of equations based on differential delay measurements made utilizing the virtually-concatenated groups; and
solving the system of equations to obtain information utilizable to determine delay of the given link.

5. The method of claim 1 wherein for a given one of the two-member virtually-concatenated groups, the differential delay measurement is made at a particular one of the associated nodes by comparing frame indicator fields for concurrently arriving frames.

6. The method of claim 5 wherein the frame indicator fields comprise multiframe indicator fields (MFIs) of multiframe headers of the two-member virtually-concatenated group.

7. The method of claim 1 wherein the given link is part of a biconnected component of the network.

8. The method of claim 7 wherein the biconnected component of the network comprises a logical ring.

9. The method of claim 8 wherein the logical ring comprises n nodes ($N_1, N_2, \ldots N_n$) interconnected by n links ($L_{1,2}, L_{2,3}, \ldots L_{n,1}$) with delays ($D_{1,2}, D_{2,3}, \ldots D_{n,1}$), the method as applied to the logical ring comprising the steps of:
setting up for each node a two-member virtually-concatenated group with its neighboring node in the ring such that the routes taken by the two members are along opposite sides of the ring;
measuring a differential delay for each node;
for a given virtually-concatenated group set up between a given one of the nodes and its neighboring node in the ring, formulating an equation for the corresponding delay;
repeating the equation formulation step for each of the other virtually-concatenated groups to obtain a system of n equations;
solving the system of n equations; and
based on a result of the solving step, determining the delay of a particular one of the n links.

10. The method of claim 8 wherein after delays are determined for one or more links of the logical ring, another logical ring of the network is selected and a link delay determination process is repeated for that logical ring.

11. The method of claim 1 wherein delay is determined for a given one of the virtually-concatenated groups by configuring a first node associated with the group to send designated information that is substantially the same as that received from a second node associated with the group, the delay being determined as a function of a round-trip delay measurement made using the designated information.

12. The method of claim 11 wherein the designated information comprises frame indicator bits.

13. The method of claim 1 wherein at least one of the method steps is implemented at least in part in software running on a processor of at least one node of the network.

14. A processor-implemented method of determining link delay in a network comprising a plurality of nodes, the method comprising the steps of:
identifying pairs of nodes associated with a given link;
for each of the identified pairs, setting up a virtually-concatenated group between the nodes of that pair;
utilizing the virtually-concatenated groups to make delay measurements; and
processing the delay measurements to determine delay of the given link;
wherein the method performs the following steps to determine a delay $D_{i,j}$ of a given link $L_{i,j}$ between nodes $N_i$, $N_j$ in the network:
setting up a first two-member virtually-concatenated group between node $N_i$ and another node $N_k$ such that the routes taken by the two members are disjoint and one of the routes goes over the link $L_{i,j}$, the two routes forming a ring $R_i$ comprising nodes $N_i$, $N_j$ and $N_k$ and link $L_{i,j}$;
computing a differential delay $\delta_i$ for the first virtually-concatenated group;
setting up a second two-member virtually-concatenated group between node $N_j$ and node $N_k$ such that the two routes are on opposite sides of ring $R_i$;
computing a differential delay $\delta_j$ for the second virtually-concatenated group; and
determining the delay $D_{i,j}$ as $$D_{i,j} = \frac{\delta_i - \delta_j}{2}.$$

15. An apparatus for use in determining link delay in a network comprising a plurality of nodes, the apparatus comprising:
a processor; and
a memory coupled to the processor;
wherein the processor is operative to perform the steps of:
identifying pairs of nodes associated with a given link;
for each of the identified pairs, setting up a virtually-concatenated group between the nodes of that pair;
utilizing the virtually-concatenated groups to make delay measurements; and
processing the delay measurements to determine delay of the given link;
wherein one or more of the virtually-concatenated groups comprise two-member virtually-concatenated groups; and
wherein for a given two-member virtually-concatenated group C, the group having members $M_1$ and $M_2$ using respective paths $P_1$ and $P_2$, a differential delay measurement $\delta_C$ is determined as $$\sum_{links L_i \in P_1} D_i - \sum_{links L_j \in P_2} D_j = \delta_C,$$

$D_i$ and $D_j$ being delays of respective links $L_i$ and $L_j$.

16. The apparatus of claim 15 wherein the apparatus is implemented in a distributed manner within one or more of the network nodes.

17. The apparatus of claim 15 wherein the apparatus is implemented in a centralized manner utilizing a central controller.

18. An article of manufacture comprising a non-transitory machine-readable medium storing one or more programs for use in determining link delay in a network comprising a plurality of nodes, the one or more programs when executed in a processor performing the steps of:
identifying pairs of nodes associated with a given link;
for each of the identified pairs, setting up a virtually-concatenated group between the nodes of that pair;
utilizing the virtually-concatenated groups to make delay measurements; and processing the delay measurements to determine delay of the given link;

wherein one or more of the virtually-concatenated groups comprise two-member virtually-concatenated groups; and wherein for a given two-member virtually-concatenated group C, the group having members $M_1$ and $M_2$ using respective paths $P_1$ and $P_2$, a differential delay measurement $\delta_C$ is determined as $$\sum_{links L_i \in P_1} D_i - \sum_{links L_j \in P_2} D_j = \delta_C,$$

$D_i$ and $D_j$ being delays of respective links $L_i$ and $L_j$.

* * * * *